United States Patent [19]
Humbrecht et al.

[11] Patent Number: 5,403,661
[45] Date of Patent: Apr. 4, 1995

[54] PREADHERED MELT SPUN SPIN-DRAWN POLYESTER FILAMENTS

[75] Inventors: Remy Humbrecht, Littau; Peter Beutler, Meggen; Armin Mueller, Emmenbrucke, all of Switzerland

[73] Assignee: Viscosuisse S.A., Emmenbrucke, Switzerland

[21] Appl. No.: 213,140

[22] Filed: Mar. 15, 1994

Related U.S. Application Data

[60] Division of Ser. No. 774,012, Oct. 8, 1991, Pat. No. 5,352,483, which is a continuation-in-part of Ser. No. 134,538, Dec. 15, 1987, abandoned.

[30] Foreign Application Priority Data

Mar. 24, 1983 [CH] Switzerland ............................ 1614/8
Mar. 15, 1984 [WO] WIPO .................. PCT/CH84/0042

[51] Int. Cl.$^6$ ............................................ D02G 3/00
[52] U.S. Cl. .................................. 428/378; 428/413; 428/414; 428/480
[58] Field of Search ................ 428/378, 413, 414, 480

[56] References Cited

U.S. PATENT DOCUMENTS

| | | | |
|---|---|---|---|
| 3,464,878 | 9/1969 | Schwarz | 156/330 |
| 3,793,425 | 2/1974 | Arrowsmith | 264/210 |
| 4,121,901 | 10/1978 | Bourrain | 427/207 R |

OTHER PUBLICATIONS

Wooton, D. B., "The Adhesion of Textile Tire Materials", *Rubber World*, pp. 36–41 (Apr. 1984).
*Epoxy Resins Chemistry and Technology*, ed. Clayton A. May, et al., Marcel Denker, Inc., New York, p. 287 (1973).

*Primary Examiner*—Edith Buffalow
*Attorney, Agent, or Firm*—Seidel, Gonda, Lavorgna & Monaco

[57] ABSTRACT

The present invention discloses preadhered, melt-spun, spin-drawn polyester filaments having improved adhesive properties towards rubber and processes for making the same. The process for making these filaments include the following steps:

(a) spin-drawing polyester filaments at an up-take speed ranging between about 2,000 and about 6,000 meters per minute by using an integrated spin-drawing process; and (b) immediately after spin-drawing, applying to the polyester filament a composition which has simultaneously about 0.05 to about 0.5% by weight of a polyepoxide and about 5 to about 140 ppm of a tertiary amine with linear functional groups.

The resulting polyester filament has a minimum adherence towards rubber in the Strip-test of about 16.0 to about 21.5 daN.

5 Claims, 2 Drawing Sheets

PREADHERED MELT SPUN SPIN-DRAWN POLYESTER FILAMENTS

CROSS-REFERENCE INFORMATION

This is a divisional of U.S. patent application Ser. No. 774,012, which was filed on Oct. 8, 1991, and is now U.S. Pat. No. 5,352,483. Application Ser. No. 774,012, is, itself a continuation-in-part of U.S. patent application Serial No. 134,538, filed on Dec. 15, 1987, and now abandoned.

FIELD OF THE INVENTION

The invention relates to preadhered, melt-spun, spin-drawn polyester filaments with good adhesive properties towards rubber and processes for making the same.

BACKGROUND OF THE INVENTION

To improve the adhesive properties of synthetic filaments towards rubber, it is customary to treat them with a composition which is a mixture of latex and resorcinol-formaldehyde (RFL) resin. This composition is then hardened on the filaments by means of a thermal treatment.

The most widely used synthetic filaments for reinforcing rubber-based products, such as automobile tires, flexible tubes, V-belts and conveyor belts are polyester filaments. There is, however, a serious disadvantage associated with polyester reinforcing filaments. This disadvantage is that such filaments have an insufficient number of reactive end groups, thus resulting in a poor filament/RFL bond.

In view of the above, the industry has discovered that it is necessary to subject the polyester filaments to a pretreatment process. This pretreatment, also referred to as preadherization, is very often carried out by the fiber manufacturer himself, so that the consumer can carry out the adherization with RFL before vulcanizing the filament with rubber.

There are numerous existing processes for preadhering polyester filaments. U.S. Pat. Nos. 3,383,242 and 3,297,468, for example, relate to a process for pretreating polyethylene terephthalate filaments by applying to said filaments: (a) a dispersion of a hardenable combination of a diepoxide and a diamine having primary or secondary functions (hardening agent) and (b) a water-dispersible filament finish. The application process disclosed therein takes place on an undrawn filament, which is wound up and subsequently conventionally stretched in a second operation.

The disadvantage of the preadhering process disclosed therein is that it is necessary to use a composition which solidifies into a gel-like mass after a few hours at room temperature. The stability of such a solution is thus poor.

Moreover, the filament cannot be drawn using heated rollers, but can only be drawn in ovens, even at slow take-off speeds. In view of this, excess preadhering solution would harden on the rollers and would quickly build up into a crust. It has also been observed that the filaments pretreated by the process disclosed therein have impaired mechanical properties.

In U.S. Pat. No. 3,962,011 nylon cord yarns (i.e. already plied yarns), are impregnated with a combination of a polyepoxide and a tertiary amine. The combination is then thermally hardened.

U.S. Pat. No. 3,793,425 and German Offenlegungsschrift 2,056,707 relate to an integrated spin-drawing process for producing polyester filament yarns by applying a composition containing a polyepoxide resin buffered at an alkaline pH to the freshly spun and likewise still unstretched polyester filament. After the composition has been applied thereto, the treated filaments are then hot-stretched and wound-up.

U.S. Pat. No. 3,464,878 describes a system composed of polyepoxide and a pyrrolidone which is catalyzed with an alkaline compound (isocyanate, NaOH). Due to a curing process, this catalyst releases a tertiary amine. The concentration of the pyrrolidone and the catalyst are extremely high. The process of U.S. Pat. No. 3,464,878 results in a subcoated fiber of about 0.3% by weight. Moreover, this subcoat is cured (i.e., under conditions of heating to 218° C. for one minute). Although tertiary amines are being released, U.S. Pat. No. 4,464,878 does not disclose the use of these tertiary amines.

SUMMARY OF THE INVENTION

The present invention provides preadhered, melt-spun, spin-drawn polyester filaments having improved adhesive properties towards rubber and process for making the same.

The process for preadhering melt-spun, spin-drawn polyester filaments, which improves the adhesive properties of the filament towards rubber, comprises the steps of:

(a) spin-drawing polyester filaments at an up-take speed ranging between about 2,000 and about 6,000 meters per minute by using an integrated spin-drawing process; and (b) immediately after spin-drawing, applying to the polyester filament a composition comprising simultaneously about 0.05 to about 0.5% by weight of a polyepoxide and about 5 to about 140 ppm of a tertiary amine with linear functional groups.

The resulting polyester filament has a minimum adherence to rubber in the Strip-test (Pull-force) ranging from between about 16.0 to about 21.5 daN.

Objects, aspects and advantages of the present invention will become apparent to those skilled in the art upon reading the following detailed description when considered in conjunction with the accompanying drawings and appended claims.

BRIEF DESCRIPTION OF THE DRAWINGS

A more complete appreciation of the invention and many attendant advantages thereof will be readily obtained as the same becomes better understood by reference to the following detailed description when considered in connection with the accompanying figures briefly described below.

DETAILED DESCRIPTION OF THE INVENTION

Figure 1:
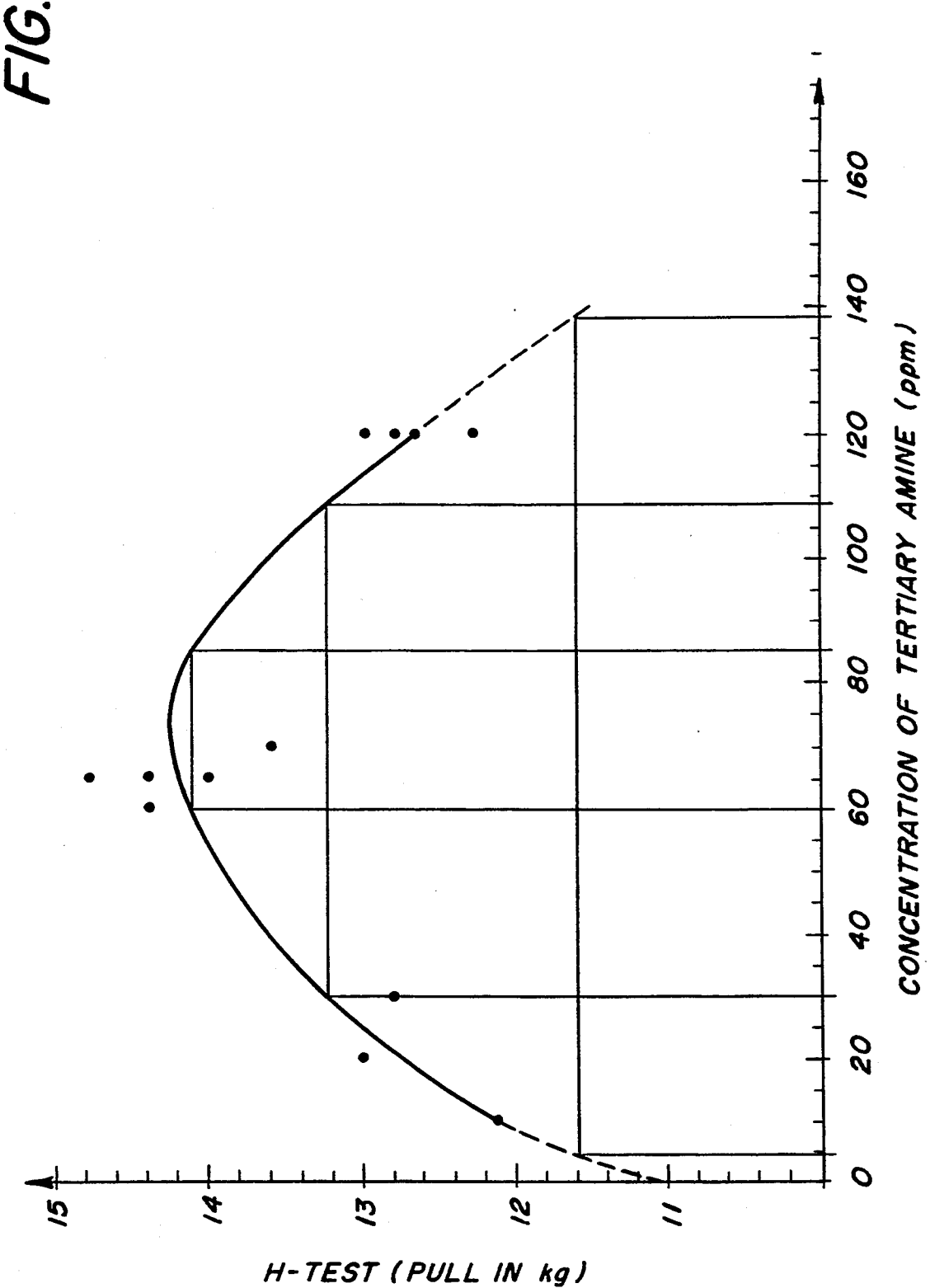
FIG. 1 is a graph which demonstrates the influence of the concentration of a tertiary amine on adherence based on the H-test.

As stated above, the present invention provides a process for preadhering polyester filaments by applying a composition to a stretched or drawn filament.

In accordance with the present invention, the composition for preadhering spin-drawn polyester filaments comprises a tertiary amine having the following general formula:

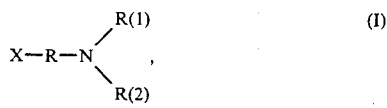

where:

R is $-(CH_2)_n-$ or $-C_6H_5-$, and "n" is $1 \leq n \leq 6$;

R(1) and R(2) are identical or different and are each selected from the group consisting of: alkyl groups having $C_{1-6}$, hydroxalkyl groups having $C_{1-6}$, alkyl aryl groups or aryl groups; and X is H, OH, $NH_2$, NHR(3), NR(4), R(5), or R(6), where R(3), R(4), R(5) and R(6) are each selected from the group consisting of alkyl groups having $C_{1-6}$ or aryl groups.

Compound (I), above, is a tertiary amine having at least one tertiary function. The tertiary amine has a catalytic action on the reaction between the polyepoxide and the polyester polymer and does not act as a curing agent.

The group "X" of Compound (I) can be a primary, secondary or tertiary amine. In that case, the second amine function increases the catalytic activity. It has been discovered that, by virtue of Compound (I), an adhesive layer is formed which, alone or together with an RFL treatment, confers good adhesion to the polyester filament upon vulcanization into rubber.

Any suitable tertiary amine, which falls into the parameters of Compound (I), and which can confer the desired advantageous results, can be employed. It has been discovered, however, that Compound (I) is preferably selected from the group consisting of: N,N-dimethylbenzylamine, 3-diethylamino-2-propylamine, 3-dimethylamino-1propylamine, tribenzylamine, 2,4,6-Tris(dimethylamiomethyl)-phenol, triethanolamine or triethylamine.

Tertiary amines react very differently from their primary or secondary counterparts. Specifically, primary and secondary amines normally react, with epoxides to form an adduct in the following manner:

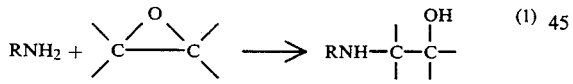

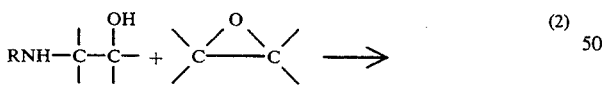

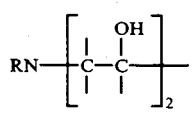

Formula (1) shows generally the reaction of a primary amine with an epoxide. In Formula (2), the resulting secondary amine is able to react with another epoxide molecule to form a tertiary amine which is catalytically inactive due to its sterical hindrance (i.e., resultant tertiary amine is too weakly catalytic to promote additional polymerization).

Formula (1) and (2), above, also demonstrates that, in the reaction between primary and secondary amines with an epoxide, both amines are consumed. This results in a higher molecular weight product. Therefore, high concentrations of the starting primary or secondary "curing" agents are necessary.

The tertiary amines represented by Compound (I) have linear functional groups. This reduces the degree of steric hindrance. The tertiary amines encompassed by Compound (I) of the present invention can initiate the complete polymerization of epoxides; and, when the polymerization reaction is terminated, the tertiary amine remains unchanged and can be recovered.

An example of the chain mechanism of such a polymerization reaction is as follows:

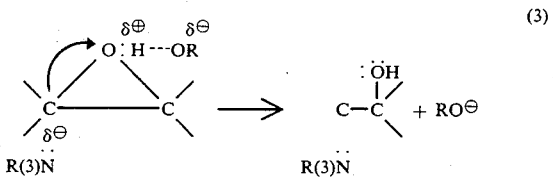

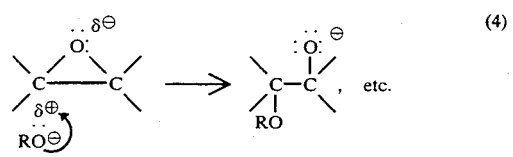

Termination could then occur as shown below with the generation of a new hydroxyl group and unsaturation, without the necessary development of a free alkoxide ion.

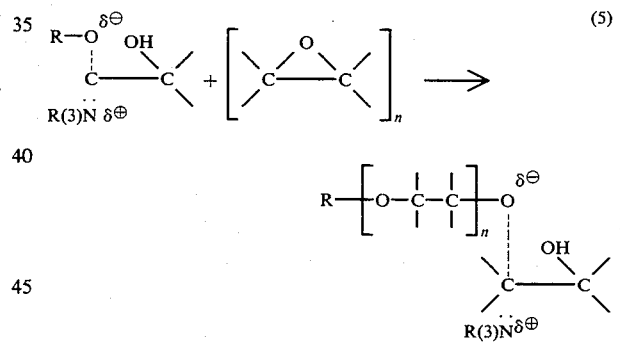

As can be seen from the above mechanism, the tertiary amine remains unchanged. This demonstrates that the tertiary amine can react as a real catalyst (i.e., it is chemically unchanged at the end of the polymerization reaction).

The type of polyepoxide which can be employed when practicing the present invention is not critical. However, the presently preferred polyepoxide type is that of the glycidyl ethers which are generally prepared by reacting epichlorohydrin with an alkanol or a phenol. The polyepoxide can be saturated, unsaturated, aliphatic, cycloaliphatic, aromatic, heterocyclic or substituted.

The polyepoxide compounds can be either monomers or polymers having at least two epoxy groups per molecule. Examples of such compounds include, but are not limited to: the epoxy derivatives of bisphenol A or of phthalic acid, the epoxyphenol novolac, the epoxycresol novolac, the glycidyl isocyanurates, the epoxy-containing derivatives of hydantoin (e.g., hydantoin triglycidyl ether), the aliphatic glycidyl ethers (e.g., butanediol diglycidyl ether, ethyleneglycol diglycidyl ether or glycerol triglycidyl ether), and the glycidyl derivatives of triazine (e.g., tris-(2,3-epoxypropoxy)-3-propionyl-1,3,5-hexahydro-s-triazine (TEPS)).

Because the above-mentioned polyepoxide compound TEPS is readily soluble in water, it was employed in the composition described in U.S. Pat. No. 4,121,901. The composition according to the invention is in solution in water, alcohol, a water-alcohol mixture or a fiber finish. For the purposes of this invention a fiber finish is chiefly a product which improves the frictional, antistatic and wetting properties of the synthetic filament.

The composition of the invention containing the polyepoxide and Compound (I) can be used either on its own or together with auxiliaries. For the purposes of this invention auxiliaries are products which are capable of improving still further the adhesion of the filament to rubber. Examples of such auxiliaries include, but are not limited to: carrier or swelling agents (e.g., ethylene glycol, caprolactam or polyvinyl or benzyl alcohol), or solvents which permit more efficient diffusion of the epoxide into the polymer.

Secondary preadhering agents, such as those based on silanes (e.g., epoxysilanes), polychlorophenols (e.g., Vulcabond E from VULNAX) or those having free or blocked isocyanate groups, or urethanes, polyimines, polyacrylates and polyamides, can also be applied. It is likewise possible to subject the filament, which has been preadhered according to the present invention, to a treatment with a conventional pretreatment agent comprising a polyepoxide and a blocked polyisocyanate before the RFL treatment.

The process described herein is based on a catalysis (the catalyst being a tertiary amine) of the polyepoxide directly to the polyester filament, without any curing steps, and with extremely low concentrations of the catalyst. The process produces a polyester filament with an activated polyepoxide bonded thereto. Thereafter, the RFL mixture is bonded to the activated polyepoxide.

The tertiary amine employed in the process of the present invention is not a reactant or a product of the reaction. Rather, the tertiary amine employed herein is a catalyst.

The heat content of the drawn fiber provides the reaction conditions. Generally, the temperature of the fiber is a maximum of about 100° C. and decreases exponentially during winding. Accordingly, the composition is applied simultaneous with spin-drawing.

The above-mentioned composition of polyepoxide and tertiary amine is immediately applied to the stretched or drawn filament. As used herein, the term "immediately" refers to the application of the composition to the filament after spin-drawing the fiber, and when the fiber is not linked to any device. There is substantially no lag time therebetween. It should be noted that an "immediate" application is distinguished from the after treatment or later process steps disclosed in the prior art pretreating processes.

The term "immediately" can also be interpreted as occurring simultaneously with the spin-drawing step. In the process of the present invention, unlike in the process disclosed in U.S. Pat. No. 3,793,425 and German Offenlegungsschrift 2,056,707, the following desired features are observed: (a) the stretch rollers do not become encrusted with excess polyepoxide; and (b) the resulting filaments have good mechanical properties.

The amount of polyepoxide and Compound (I) applied to the filament is critical. Regarding the concentrational level of the polyepoxide, the following was observed: (a) a concentrational level below about 0.05% gives rise to the problems of inadequate adhesion and irregular distribution of the polyepoxide along the filament; and (b) a level greater than about 0.5% does not improve adhesion.

Regarding the concentrational level of Compound (I), it has been observed that maximum adhesion of the filament to the rubber occurs when the Compound is applied in an amount ranging from about 5 to about 140 ppm, preferably, from about 10 to about 120 ppm, and even more preferably from about 25 to about 115 ppm, and most preferably from about 55 to about 90 ppm. All of the aforementioned concentrational levels of the polyepoxide and Compound (I) are relative to the treated polyester filament.

It was surprising to discovery that Compound (I) reacts as a catalyst with extreme low concentrations (i.e., in amounts ranging from between about 5 to about 140 ppm). A comparison of primary and secondary amines with Compound (I) is not proper since, when compared with the amount of Compound (I) needed, primary and secondary amines requires extremely high concentration levels. See, for example, Formula (1) and (2) and the comments associated therewith.

For the purposes of the present invention, polyesters are linear polycondensed esters prepared by reacting one or more diols of the $HO(CH_2)_nOH$ series where "n" is $1 \leq n \leq 10$ with a dicarboxylic acid, preferably terephthalic acid, or a corresponding diester (e.g., dimethyl terephthalate). The polyesters can also be modified with organic or inorganic additives.

The polyester used for reinforcing elastomers has been oriented and stretched in order to obtain reinforcing filaments having satisfactory mechanical properties for their specific use. The preferred polyester is polyethylene terephthalate without restriction as regards to the terminal carboxyl group or diethylene glycol content.

The drawn filament is produced in an integrated spin-drawn process wherein the filament is wound up at take-up speeds ranging from between about 2,000 to about 6,000 m/min. The composition according to the present invention is applied by means of one or two metering pegs between the final duo and the winding apparatus.

It may be necessary to do further treatments on the stretched filament in order to improve its running performance or fatigue level. An example of such further treatments includes, but is not limited to, the application of polysiloxanes, silanes, polyethylene glycols or ester or mineral oils.

By practicing the process disclosed herein, it is now possible to produce a polyester filament which has: (a) very good mechanical properties and an improved adhesion to rubber. The implementation of this process is also extremely simple and economical, since the stretching process is not adversely affected.

The denier of the polyester filament yarn thus produced is not critical. Preferably, the denier ranges from between about 500 and about 2,500 dtex. Moreover, the number of individual filaments is between about 80 and about 500.

This filament yarn is particularly suitable for reinforcing rubber articles. Examples of such rubber articles which can be reinforced by the novel, pretreated polyester filaments of the present invention include, but are not limited to: automobile tires, conveyor belts, V-belts, flexible tubes and the like. It can also be used for articles which are coated with polyvinyl chloride.

The filament yarn thus obtained is ready for a conventional treatment with an RFL bath prior to the vulcanization with rubber. For certain uses it can be vulcanized into the rubber without RFL impregnation.

The filament yarn preadhered according to the present invention can also be subjected to a secondary treatment in a conventional polyepoxide bath mixed with an aqueous dispersion of a blocked polyisocyanate before it is impregnated with the RFL and/or vulcanized into the rubber.

The invention also encompasses novel, preadhered polyester filament yarns thus produced by the aforementioned novel process, without restriction as regards the terminal carboxyl group content.

The polyepoxide, which is advantageously soluble in water, is dissolved in a concentration of 5 to 99% in a presubmitted amount of water, water-ethanol mixture or solvent, such as polyglcols, benzyl alcohol or ester oils. Afterwards, but before the composition is used, Compound (I) is added in a concentration of 0.01 to 6.0, preferably 0.05 to 3.0, % by weight.

Production of cord yarn

A polyester filament yarn having a denier of 1,100 f ("f" stands for the filament which is well-known in the art), and 192 high-modulus, high-strength monofilaments is produced as follows using a spin-draw process:

The highly viscous polymer is melted at a temperature of 280° to 330° C. in an extruder, and the melt is extruded through a spinneret. After being cooled in an airblown shaft, the filaments are drawn off at normal speed and are guided over (a) a finish application roller, where a spin finish is applied, and (b) a plurality of pairs of rollers which are operated at different temperatures and speeds, where the filaments are stretched and heat-set.

Depending on the desired mechanical yarn properties the rollers can have temperatures ranging between about 70° and about 245° C. The roller speeds are such that the spun filaments can-be stretched up to six times their original length. The filaments are directly wound up at a take-up speed of about 3,000 m/min.

A number of these filament yarns are twisted together in conventional manner to form a cord yarn (see, Example 2, below). The yarn is then impregnated on a treatment machine with an RFL solution consisting of 20% of a resorcinol-formaldehyde resin and of a latex and is then thermally treated in conventional manner at 150° C. for 30 seconds and then at 235° C. for 1 minute. This impregnated cord is then vulcanized into the rubber.

The adhesive properties of the cord vulcanized into the rubber are tested using UNIROYAL's A-300 Strip-test, in which the variable measured is the force ("pull-force") necessary to separate two layers of rubber from a cord fabric vulcanized into the rubber. According to UNIROYAL's Strip-test, a pull-force value of less than 10 daN indicates a poor adhesion of the filament to the rubber. On the other hand, a pull-force value of greater than 15 daN indicates a good adhesion of the filament to the rubber. A pull-force value of 20 daN or more indicates a superior adhesion of the filament to the rubber.

The appearance value, judged on a scale from 0 to 5, indicates how well the rubber adheres to the cord layer. The highest value of 5 characterizes an adhesive bond where the crack appears in the rubber and no cord is visible at the crack surface. On the other hand, the poorest value of 0 characterizes an adhesive bond where the crack takes place at the rubber-cord interface, and no rubber remains stuck to the cord layer. The values from 0.5 to 4.5 are intermediate levels.

Examples

This invention will still more fully be understood from the following examples. These examples are only intended to demonstrate select embodiments of the invention and are, in no way, intended to limit the scope thereof.

Examples 1 to 11

The yarn is produced in accordance with the invention as mentioned above, except that the filaments are guided at a point between the final duo and winding apparatus over a preadhering device in the form of a metering peg where the composition is applied. The composition consists of a polyepoxide, a tertiary amine and a solvent.

The concentration of the polyepoxide in these examples was 35% by weight, while that of the tertiary amine is set out given in the table below. The level of epoxy on the fiber in the examples was 0.2% of epoxy resin. The yarn thus produced was impregnated with RFL and then vulcanized into the rubber.

The table below shows the Strip-test results (i.e., Pull-force and Appearance value) obtained on applying different compositions to the filament.

Example 1 shows how poor the adhesion was when the composition does not contain Compound (I) according to the invention in addition to the polyepoxide.

In Examples 2 to 4, the catalytic effect of the tertiary amine according to the invention comes into play. Example 3 represents an optimal tertiary amine concentration at which the pull-force value is at a maximum.

In Example 5 only 0.05% of polyepoxide, and not 0.2%, was applied to the yarn. While the pull-force is lower than Example 3 which has the sure concentration of the tertiary amine, it is still higher than that in Example 1, where the polyepoxide level was four times as high but no Compound (I) was present.

Examples 6 to 10 likewise form part of the subject-matter of our invention. As can be seen, the nature of the polyepoxide (diepoxide or triepoxide having different structures) is importance (See, Examples 6 and 8). The solvent, by contrast, is not critical (See, Examples 8 and 9). In Examples 7, 8 and 10 different amines are used together with the same epoxide.

In. Example 11, ethylene oxide was added to the polymer before being melted in the extruder. The resulting filament has a terminal carboxyl group content of only 5 mol/t.

The filament yarn produced in accordance with the invention as regards its composition and the process used in making it has fairly good adhesive properties. The adhesive properties are only insignificantly worse than those in Example 8, where the yarn contains a terminal carboxyl group content of 20 mol/t.

The filaments of Examples 2 to 11, which were obtained in accordance with the invention, are distinguished from those of the prior art by good processing properties, for example the absence of deposits at the twisting stage. Although the individual filaments are treated, the fatigue level of the tire cord produced is not impaired.

TABLE

| Example | Polyepoxide | Solvent | Compound (I) | Pull daN | Appearance value |
|---------|-------------|---------|--------------|----------|------------------|
| 1 | TEPS (a) | H₂O | none | 10 | 1.0 |
| 2 | " | " | 0.5% DPA (g) | 16.0 | 3.0 |
| 3 | " | " | 1.0% DPA (g) | 20.5 | 3.5 |
| 4 | " | " | 2.0% DPA (g) | 18.0 | 3.5 |
| 5 | " | " | 1.0% DPA (g) | 16.0 | 3.0 |
| 6 | BDDG (b) | " | 0.5% DMB (f) | 14.8 | 3.0 |
| 7 | GTG (c) | " | 1.0% DMPA (e) | 16.3 | 3.0–3.5 |
| 8 | " | " | 0.5% DMB (f) | 18.0 | 3.5 |
| 9 | " | H₂O/ethanol 2:1 | 0.5% DMB (f) | 19.0 | 3.0–3.5 |
| 10 | " | " | 0.8% TEA (d) | 20.0 | 3.5 |
| 11 | " | H₂O | 0.5% DMB (f) | 15.0 | 3.0 |

(a) TEPS = tris(2,3-epoxypropoxy)-3-propionyl-1,3,5-hexahydro-s-triazine
(b) BDDG = butanediol diglycidyl ether
(c) GTG = glycerol triglycidyl ether
(d) TEA = triethanolamine
(e) DMPA = 3-dimethylamino-1-propylamine
(f) DMB = dimethylbenzylamine
(g) DPA = 3-diethylamino-1-propylamine Referring now to FIG. 1, this is a graph which demonstrates the influence of the concentration of a tertiary amine on the filament's adherence to rubber based upon the H-test. The x-axis of FIG. 1 represents the pull-force in kilograms need to separate the fibers from the rubber based upon the H-test. The y-axis represents the amount of tertiary amine (3-diethylamino-1-propylamine) on the filament in parts per million.

As is clearly demonstrated by FIG. 1, a maximum adherence value occurs when about 75 ppm of the tertiary amine is present.

Figure 2:
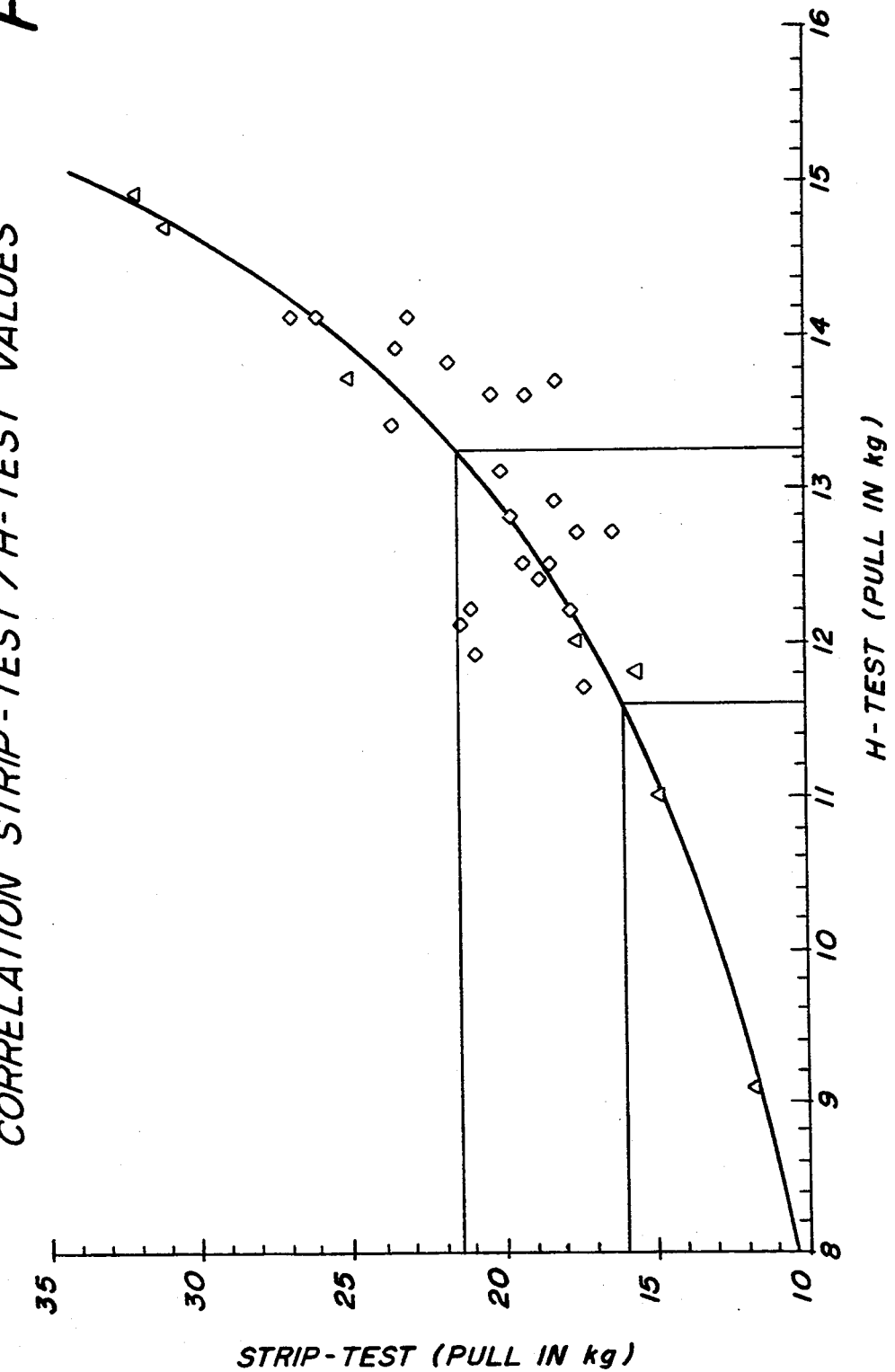
FIG. 2 is a graph showing the relationship between H-test values and Strip-test values.

As stated before, it has been discovered that, in order to satisfy the needs of the industry, a polyester filament should preferably have a minimum adherence to rubber in the Strip-test ranging from between about 16.0 to about 21.5 daN. The H-test results of FIG. 1 can be converted to Strip-test results by referring to FIG. 2. Specifically, FIG. 2 demonstrates the relationship between Strip-test results and H-test results By referring to FIG. 2, it can be seen that, when the preferred minimum adherence value to rubber in the Strip-test is 16.0, this corresponds to a similar, preferred, minimum H-test value of about 11.6. On the other hand, when the more preferred minimum adherence value to rubber in the Strip-test is 21.5, this corresponds to a similar, more preferred, minimum H-test value of about 13.2.

By then taking these minimum preferred and more preferred H-test values and plotting them on to FIG. 1, the following was observed: (a) when the polyester filament was treated in accordance with the present invention such that it contained from about 5 to about 140 ppm of the tertiary amine thereon, the preferred minimum adherence value was obtained, and (b) when the polyester filament was treated in accordance with the present invention such that it contained from about 30 to about 110 ppm of the tertiary amine thereon, the more preferred minimum adherence value was obtained. Finally, FIG. 1 also demonstrates that, when practicing the present invention, the most preferred minimum adherence values are obtained when the polyester filament is treated in accordance with the present invention such that it contains from about 60 to about 85 ppm of the tertiary amine thereof.

It is evident from the forgoing that various modifications can be made to embodiments of this invention without departing from the spirit and scope thereof, which will be apparent to those skilled in the art. Having thus described the invention, it is claimed as follows.

That which is claimed is:

1. A preadhered, melt-spun, spin-drawn polyester filament having improved adhesive properties towards rubber, said polyester filament being prepared from a process comprising the step of:
   (a) spin-drawing polyester filaments to an up-take speed between about 2,000 and about 6,000 meters per minute using an integrated spin-drawing process; and
   (b) immediately after spin-drawing, applying to the polyester filament, a composition comprising simultaneously about 0.05 to about 0.5% by weight of a polyepoxide and about 5 to about 140 ppm of a tertiary amine with linear functional groups, wherein said tertiary amine has the following general formula:

$$X-R-N\diagup^{R(1)}_{\diagdown R(2)},$$

wherein R is —(CH₂)ₙ— or —C₆H₅—, and "n" is $1 \leq n \leq 6$;
wherein R(1) and R(2) are identical or different and are each selected from the group consisting of: alkyl groups having C₁₋₆, hydroxalkyl groups having C₁₋₆, alkyl aryl groups or aryl groups; and wherein X is H, OH, NH₂, NHR(3), NR(4), R(5), or (R6), where R(3), R(4), R(5) and R(6) are each selected from the group consisting of alkyl groups having C₁₋₆ or aryl groups, to produce a polyester filament having a minimum adherence towards rubber in the Strip-test ranging from between bout 16.0 to about 21.5daN.

2. A preadhered polyester filament as recited in claim 1 wherein, in said process of making said polyester filament, said tertiary amine is present in a concentration ranging from between about 25 to about 115 ppm.

3. A rubber composition reinforced with a preadhered, melt-spun, spin-drawn polyester filament having improved adhesive properties towards said rubber composition, wherein said preadhered polyester filament is prepared by a process comprising the steps of:
   (1) spin-drawing polyester filaments to an up-take speed between about 2,000 and about 6,000 meters per minute using an integrated spin-drawing process; and (2) immediately after spin-drawing, applying to the polyester filament, a composition comprising simultaneously about 0.05 to about 0.5% by weight of a polyepoxide and about 5 to about 140 ppm of a tertiary amine with linear functional groups, wherein said tertiary amine has the following general formula:

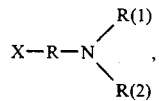

wherein R is $-(CH_2)_n-$ or $-C_6H_5-$, and "n" is $1 \leq n \leq 6$; wherein R(1) and R(2) are identical or different and are each selected from the group consisting of: alkyl groups having $C_{1-6}$, hydroxalkyl groups having $C_{1-6}$, alkyl aryl groups or aryl groups; and wherein X is H, OH, $NH_2$, NHR(3), NR(4), R(5), or (R6), where R(3), R(4), R(5) and R(6) are each selected from the group consisting of alkyl groups having $C_{1-6}$ or aryl groups, to produce a polyester filament having a minimum adherence towards rubber in the Strip-test ranging from between about 16.0 to about 21.5daN.

4. A rubber composition as recited in claim 3, wherein said preadhered filament is prepared by employing said tertiary amine in a concentration ranging from about 25 to about 110 ppm.

5. A rubber composition as recited in claim 4, wherein said preadhered polyester filament has a minimum adherence towards rubber in the Strip-test ranging from between about 16.0 to about 21.5 daN.

* * * * *